United States Patent
Yamane

(10) Patent No.: US 7,013,083 B2
(45) Date of Patent: Mar. 14, 2006

(54) CAMERA OF FLASH BUILT-IN TYPE

(75) Inventor: Kenji Yamane, Saitama (JP)

(73) Assignee: Fujinon Corporation, Saitama (JP)

( * ) Notice: Subject to any disclaimer, the term of this patent is extended or adjusted under 35 U.S.C. 154(b) by 137 days.

(21) Appl. No.: 10/798,852

(22) Filed: Mar. 12, 2004

(65) Prior Publication Data
US 2004/0190891 A1    Sep. 30, 2004

(30) Foreign Application Priority Data
Mar. 24, 2003  (JP)  ............ 2003-081239

(51) Int. Cl.
G03B 15/03    (2006.01)
G03B 17/04    (2006.01)
(52) U.S. Cl. .................. 396/177; 396/349
(58) Field of Classification Search ........ 396/176–178, 396/349, 350
See application file for complete search history.

(56) References Cited

U.S. PATENT DOCUMENTS

| | | | |
|---|---|---|---|
| 5,749,003 A * | 5/1998 | Tanabe | 396/177 |
| 6,314,244 B1 | 11/2001 | Manabe et al. | 396/177 |
| 6,374,051 B1 | 4/2002 | Yamane | 396/177 |
| 6,535,690 B1 * | 3/2003 | Tanabe | 396/62 |
| 6,636,698 B1 * | 10/2003 | Manabe | 396/85 |
| 2004/0184797 A1 * | 9/2004 | Yamane | 396/177 |

* cited by examiner

Primary Examiner—W. B. Perkey
(74) Attorney, Agent, or Firm—Young & Thompson

(57) ABSTRACT

In a flash built-in camera, a movable lens barrel is movable between a collapsed position of being contained inside a camera body, and photographing positions in front of the collapsed position, and holds a taking lens. A flip-up flash emitting unit is movable between a contained position and a flashing position, and when in the flashing position, applies flash light to a photographic field. A motor drives the movable lens barrel and the flash emitting unit. One transmission mechanism connects the movable lens barrel and the flash emitting unit with the motor, and responds to motion of the motor in a predetermined direction, to move the movable lens barrel to a photographing position and to move the flash emitting unit to the flashing position. The transmission mechanism includes one ring-shaped gear disposed about the movable lens barrel.

14 Claims, 11 Drawing Sheets

CAMERA OF FLASH BUILT-IN TYPE

BACKGROUND OF THE INVENTION

1. Field of the Invention

The present invention relates to a camera of a flash built-in type. More particularly, the present invention relates to a camera of a flash built-in type provided with a mechanism for keeping movable a flash emitting unit relative to a camera body.

2. Description Related to the Prior Art

There is a flash built-in type of camera useful in taking an exposure at night or for a rear light scene. For example, U.S. Pat. No. 6,314,244 (corresponding to JP-A 2000-330168) discloses a camera with a flip-up flash device in which a flip-up flash emitting unit is movable for the purpose of protection of the flash emitting unit or preventing a red-eye phenomenon. The flash emitting unit is movable relative to a camera body between a contained position and a flashing position, and when the camera is not used, is moved to the contained position, and when the camera is used, is moved to the flashing position where the flash emitting unit protrudes from the camera body.

To move the flash emitting unit between the contained position and the flashing position, the flash emitting unit is rotated. In the camera having the flash emitting unit being rotatable, an axis of the rotation is disposed at an end sufficiently distant from a flashing surface for the purpose of reducing an amount or rotation of the flash emitting unit between the contained position and the flashing position. The flash emitting unit is biased by a spring or the like toward the flashing position. This is in consideration of possible failure in the movement of the flash emitting unit to the flashing position due to a breakage and the like. Furthermore, a bias mechanism with a spring or the like is used for the purpose of absorbing incidental motion of the flash emitting unit in order to cope with a user s inadvertent push or pull of the flash emitting unit.

JP-A 2001-166362 discloses disabling of flash emission at the time that the flash emitting unit is in the contained position. According to this type of camera, the flash emission is switched on and off by detection of a set position of the flash emitting unit by use of a switch element. Furthermore, a retention of the flash emitting unit in the flashing position suitably determined is also important. It is known in the art that a stopper is formed with the flash emitting unit, and is contacted and retained by the camera body or the like.

U.S. Pat. No. 6,374,051 (corresponding to JP-A 2000-347250) discloses the camera in which a driving source or motor is used for moving the flash emitting unit, and also moving a movable lens barrel between collapsed and photograph-taking positions. Driving force of the motor is suitably transmitted. When a power source is turned on for the camera, the movable lens barrel is moved forwards from the collapsed position. In response to this, the flash emitting unit is moved from the contained position to the flashing position. When the power source is turned off, the movable lens barrel is moved backwards to the collapsed position in the camera. The flash emitting unit moves again from the flashing position to the contained position. A type of the camera is provided with a zoom lens in the movable lens barrel. For this type, the flash emitting unit is linked with the driving source or motor only in a section defined between the collapsed position and a wide-angle end position which is an initial position at the time of turning on the power. The flash emitting unit is unlinked from the motor if the movable lens barrel is in a section from the wide-angle end position to a telephoto end position.

The movable lens barrel in the camera is movable within a first region from the wide-angle end position to the telephoto end position with first stroke, and movable within a second region from the collapsed position to the wide-angle end position with second stroke. Typically in a zoom camera of a somewhat short focal length, the second stroke behind the wide-angle end position is excessively smaller than the first stroke in front of the wide-angle end position. In considering this, it is difficult or impossible to use the linking of the movable lens barrel with the second stroke for the purpose of moving the flash emitting unit by transmitting the driving force.

The flash emitting unit has a considerable weight, and also has stroke being remarkably great in the movement. Also, the stroke and load of the above-mentioned bias mechanism is additionally considered. Therefore, a mechanism for moving the flash emitting unit requires the driving force or the stroke being very great. To enlarge the driving force in the moving mechanism for the flash emitting unit, it is conceived to use the driving source or motor of an enlarged size. However, this is unfavorable because it causes enlargement of the size of the camera.

It is to be noted that increase in the driving force can be conceived on the basis of a greater ratio of reducing the speed of rotation of the driving source or motor. For the purpose of linking of the movable lens barrel and the flash emitting unit, it is necessary to use a rotating element which does not make one rotation even during movement in the entire stroke of the movable lens barrel. Otherwise, it is necessary to use of a straight movable element which does not reach an end position even during movement in the entire stroke of the movable lens barrel. However, the enlargement in the speed reducing factor causes the non-linked region of the rotating element or straight movable element, which cannot be contained in a space of the camera.

A rotatable structure of the flash emitting unit requires a first interface, a stopper and a second interface. The first interface is connected for movement together with the movable lens barrel. The stopper is used for setting in the flashing position in a firm manner. The second interface is for connection with a switch for detecting a position of the flash emitting unit. However, high precision in the operation can be obtained only if those elements are disposed suitably away from a rotational axis of the flash emitting unit. However, those three elements at sufficient distances from the rotational axis of the flash emitting unit enlarges a space for rotation of the flash emitting unit. This is inconsistent with reduction of the camera.

SUMMARY OF THE INVENTION

In view of the foregoing problems, an object of the present invention is to provide a camera of a flash built-in type in which a flash emitting unit can be moved together with movement of a movable lens barrel even in a simple structure, and the movement of the flash emitting unit can be kept stable and reliable by great driving force and high precision.

In order to achieve the above and other objects and advantages of this invention, a flash built-in camera includes a movable lens barrel, movable between a collapsed position of being contained inside a camera body, and at least one photographing position determined in front of the collapsed position, for holding a taking lens. A flash emitting unit is movable between a contained position and a flashing position, positioned inside the camera body when in the contained position, and positioned to protrude from the camera body when in the flashing position, for applying flash light to a photographic field. A driving source is adapted to drive the movable lens barrel and the flash emitting unit. A transmission mechanism or linking mechanism connects the movable lens barrel and the flash emitting unit with the driving source, and responds to motion of the driving source in a predetermined direction, to move the movable lens barrel to the at least one photographing position and to move the flash emitting unit to the flashing position, the transmission mechanism including at least one ring-shaped member disposed about the movable lens barrel.

The transmission mechanism or linking mechanism further comprises a transmission gear mechanism for transmitting the motion of the driving source to the movable lens barrel. The at least one ring-shaped member moves the flash emitting unit in response to rotation of the transmission gear mechanism.

The at least one photographing position comprises a wide-angle position and a telephoto position determined in front of the wide-angle position. The at least one ring-shaped member comprises a ring-shaped gear rotated by the driving source. A transmission ring is engaged with and rotated by the ring-shaped gear while the movable lens barrel moves between the collapsed position and the wide-angle position, for moving the flash emitting unit.

Furthermore, a stationary barrel has a front edge formed to project forwards from the camera body, for supporting the movable lens barrel movably in forward and backward directions. The ring-shaped gear and the transmission ring are concentric with one another, and secured to an outer surface of the stationary barrel in a rotatable manner.

Furthermore, first and second pressing projections are formed to project from the ring-shaped gear. First and second engaging portions are formed on the transmission ring, for being pressed by the pressing projections, whereby rotation of the ring-shaped gear is transmitted by couple of force to the transmission ring.

The first and second pressing projections are positioned at radii different from one another with respect to a rotational center thereof, and also the first and second engaging portions are positioned at radii different from one another with respect to the rotational center thereof.

The first and second engaging portions are first and second engaging ridges disposed to extend in an arc shape.

Specifically, the transmission mechanism includes first and second pressing projections for projecting from the ring-shaped gear. A first biasing element biases the transmission ring, to rotate the transmission ring in the first direction. A first stopper blocks rotation of the transmission ring rotating in the first direction, the first stopper operating for blocking rotationally when the movable lens barrel is moved from the collapsed position to the wide-angle position. First and second engaging projections project from the transmission ring in an engageable manner with respectively the first and second pressing projections, wherein when the ring-shaped gear rotates in the first direction, the transmission ring is caused by the first biasing element to rotate in the first direction, the first and second engaging projections rotating simultaneously with the first and second pressing projections, and when the ring-shaped gear rotates in the second direction, the transmission ring is caused to rotate in the second direction by pressing of the first and second pressing projection to the first and second engaging projections.

The linking mechanism further includes a first transmission lever for being rotated by the transmission ring. A second transmission lever rotates in response to rotation of the first transmission lever, moves the flash emitting unit. A resilient element is secured between the first and second transmission levers, for transmitting rotation of the first transmission lever to the second transmission lever, and for absorbing external force incidentally applied to the flash emitting unit via the second transmission lever, for protection thereof.

The transmission structure includes an extensible lever biasing element secured between retaining portions of respectively the first and second transmission levers.

The lever biasing element absorbs external force incidentally applied to the flash emitting unit via the second transmission lever, for protection thereof.

The lever biasing element receives tension from the first transmission lever when the driving source generates motion in reverse to the predetermined direction, for rotating the second transmission lever, to set the flash emitting unit in the contained position.

The first transmission lever has first and second lever ends, the first lever end is connected with the transmission ring. The second transmission lever has first and second engaging end, the first engaging end is engaged with the flash emitting unit, for setting in the contained position. The transmission structure is constituted by the second lever end and the second engaging end, the second engaging end is pressed by the second lever end, for rendering the flash emitting unit free from the first engaging end, to set the flash emitting unit in the flashing position.

Furthermore, a flash circuit drives the flash emitting unit to emit the flash light. A first switch is connected with the flash circuit, for being changed over by shifting of the flash emitting unit, and for inhibiting driving of the flash emitting unit when the flash emitting unit is in the contained position.

Furthermore, a stopper prevents the flash emitting unit from moving beyond the flashing position.

Furthermore, a first arm is formed to project from the flash emitting unit, for being pressed by the linking mechanism to move the flash emitting unit from the contained position to the flashing position.

Furthermore, a rotational support mechanism supports the flash emitting unit in a rotatable manner. The first arm rotates when pressed by the second transmission lever.

The first switch is disposed at a moving path of the first arm, and is changed over by the first arm.

The stopper becomes engaged with the first arm for preventing the flash emitting unit from moving.

Furthermore, a slidable cover is movable between a closed position and an open position, for covering a front of the movable lens barrel when in the closed position, and for uncovering the front of the movable lens barrel when in the open position. A cover stopper is shiftable between a locking position and a releasing position, for retaining the slidable cover in the open position when shifted in the locking position, and for allowing the slidable cover to move from the open position to the closed position when shifted in the releasing position. A lock mechanism is set in a first position when the movable lens barrel is in the at least one photographing position, and set in a second position when the movable lens barrel is in the collapsed position, the lock mechanism, when in the first position, retaining the cover stopper in the locking position, and when in the second position, allowing the cover stopper to shift from the locking position to the releasing position.

The lock mechanism moves along a front panel face of the camera body.

The lock mechanism is constituted by a lock projection formed to project from the transmission ring.

Furthermore, a slidable cover is movable between a closed position and an open position, for covering a front of the movable lens barrel when in the closed position, and for uncovering the front of the movable lens barrel when in the open position. A changer mechanism is set in a first set position when the slidable cover is in the closed position, and set in a second set position when the slidable cover is in the open position, the changer mechanism, when in the first set position, unlinking the at least one ring-shaped member from the transmission gear mechanism, and when in the second set position, linking the at least one ring-shaped member with the transmission gear mechanism.

Furthermore, a biasing element biases the flash emitting unit toward the contained position.

The changer mechanism is constituted by a cover stopper for locking the slidable cover from sliding toward the closed position before completion of movement of the movable lens barrel to the collapsed position.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1A:
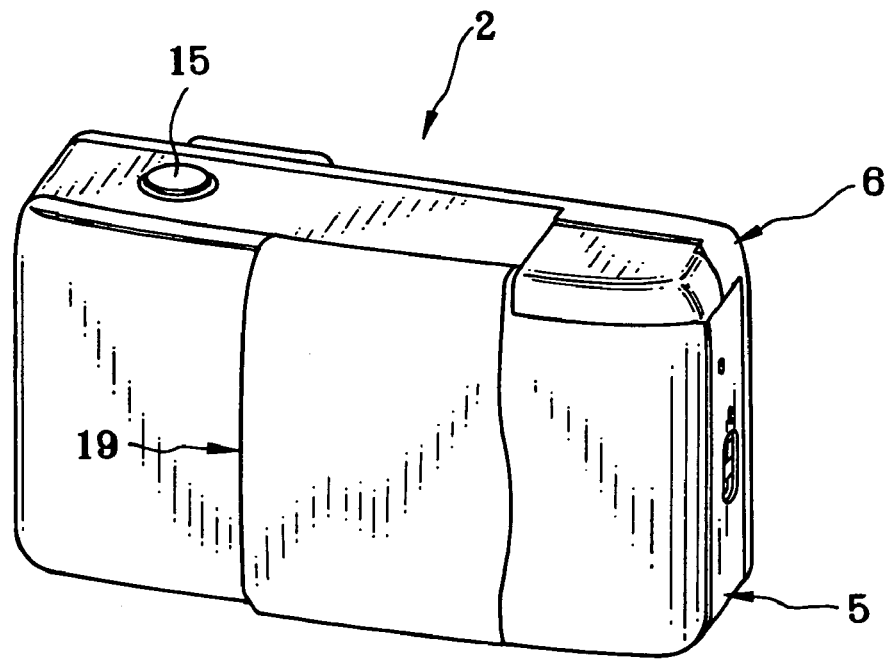
FIG. 1A is a perspective illustrating a flash built-in camera of which a slidable cover is closed.
Figure 1B:
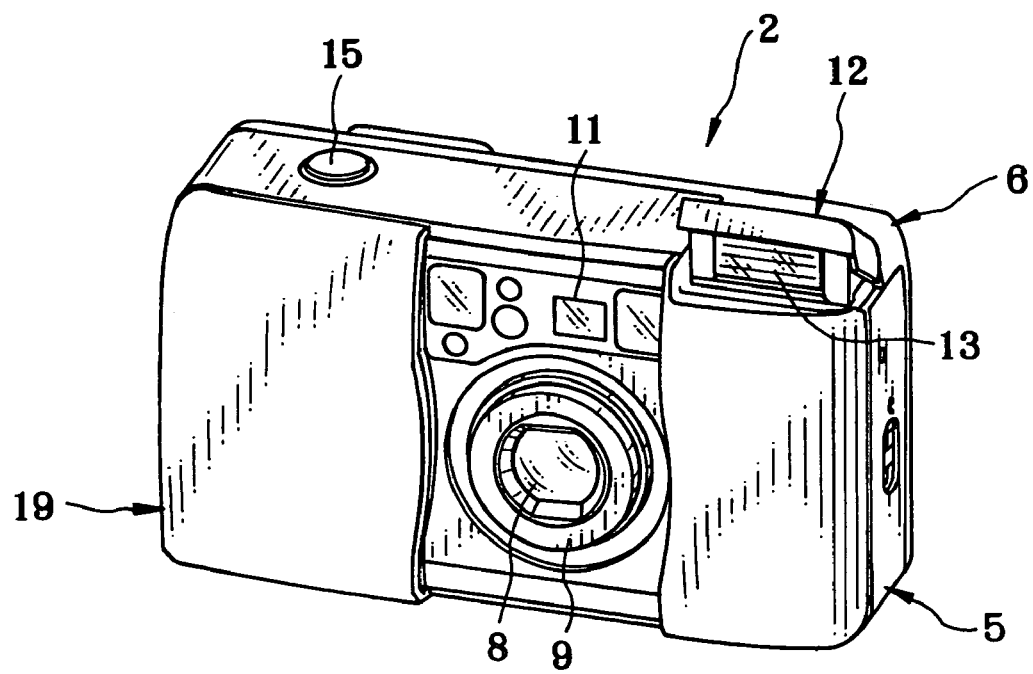
FIG. 1B is a perspective illustrating a state of the camera with the slidable cover in an open position.

In FIGS. 1A and 1B, a flash built-in camera 2 of the invention is illustrated. The camera 2 is a compact type for use with a 135 photo film cassette, and includes a camera body 4, a front cover 5 and a rear cover 6. The camera body 4 includes various elements for the purpose of taking exposures. See FIG. 2. The front and rear covers 5 and 6 are fitted on the camera body 4 to cover the same. Most of the elements or parts in the camera 2 are plastic parts. However, partial elements are metallic as required for mechanical strength, electrical conductivity or the like.

A movable lens barrel 9 is incorporated in the center of the camera 2, and includes a taking lens 8 or zoom optical system, a shutter and an aperture stop mechanism. The movable lens barrel 9 is movable between a collapsed position, a wide-angle end position and a telephoto end position. The movable lens barrel 9 is contained in the camera 2 when in the collapsed position. The movable lens barrel 9, when the power source for the camera 2 is turned on, is moved in a forward direction to come to the wide-angle end position. Also, the movable lens barrel 9 is further moved in the forward direction to come to the telephoto end position defined in front of the wide-angle end position.

A viewfinder objective window 11 is disposed higher than the movable lens barrel 9. Various windows are disposed near to the viewfinder objective window 11, including a rangefinding window for projecting light, a rangefinding window for receiving the light, a photometric window, and a self-timer window for emitting signaling light. A flip-up flash device 12 includes a flip-up flash emitting unit, which is incorporated in the camera 2 at one upper corner. There is a flashing surface 13 of the flash emitting unit directed toward the outside. The flash emitting unit is rotationally shiftable between a contained position and a flashing position, and when in the contained position, keeps the flashing surface 13 contained in the camera 2, and when in the flashing position, sets the flashing surface 13 directed to a field or object to be photographed.

A shutter release button 15 is disposed in an upper panel of the camera 2. The rear (not shown) of the camera 2 is provided with a viewfinder eyepiece window, and a zoom button for moving the movable lens barrel 9 between the wide-angle and telephoto end positions, and for moving the movable lens barrel 9 backwards to the collapsed position.

A slidable cover 19 is secured to the front of the front cover 5, and slidable to the right and left between a closed position and an open position, and when in the closed position, covers the front of the movable lens barrel 9, and when in the open position, uncovers the front of the movable lens barrel 9. The rear cover 6 is also provided with a rear lid and a battery lid. The rear lid openably closes a cassette loading chamber, a roll chamber and an exposure aperture in between. The battery lid openably closes a battery chamber.

Figure 2:
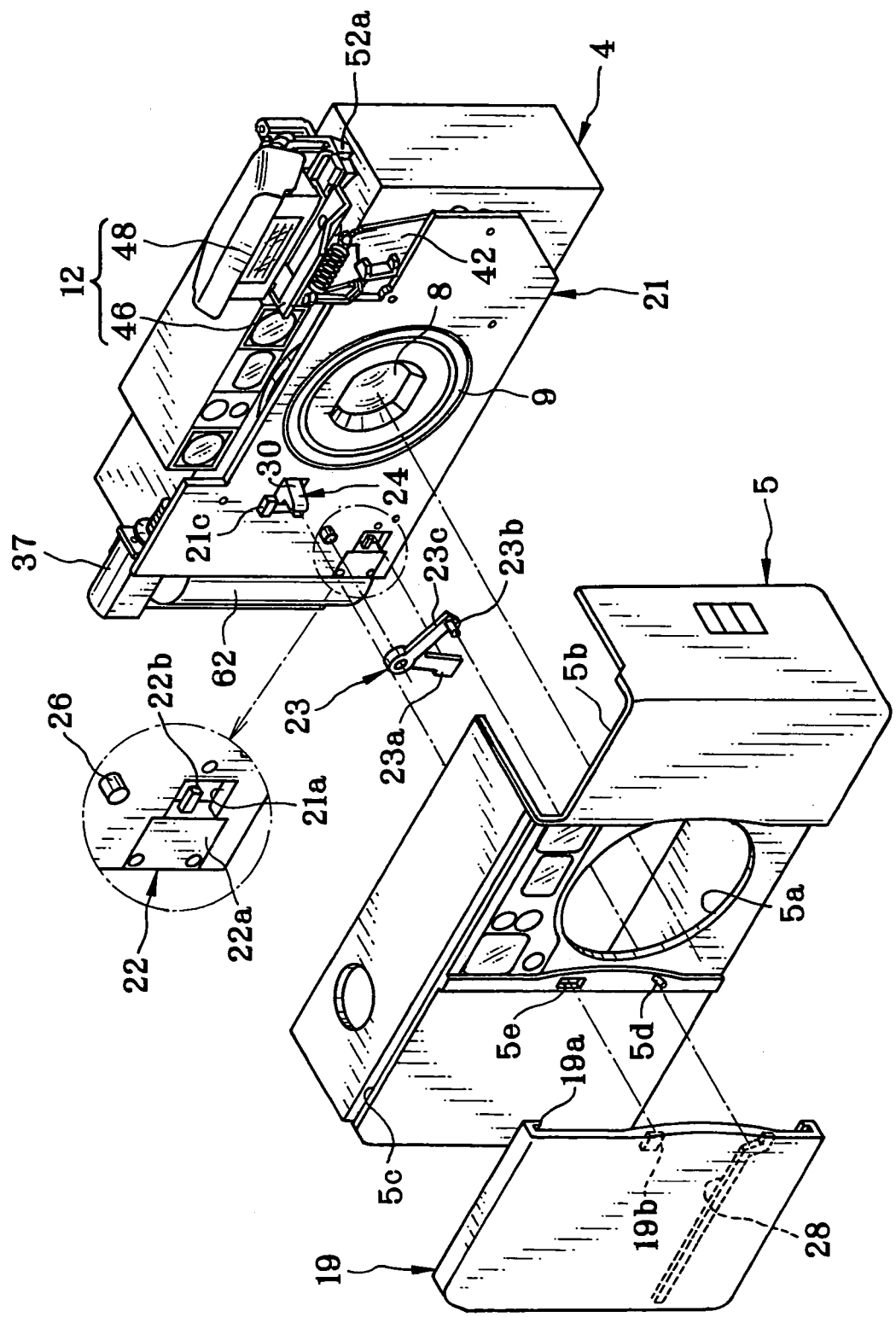
FIG. 2 is an exploded perspective illustrating a camera body, a front cover and the slidable cover.

In FIG. 2, a state of disassembly of the camera body 4, the front cover 5 and the slidable cover 19 is disposed in a perspective. A circular opening 5a is formed in the front cover 5 for insertion of the movable lens barrel 9. An upper cutout 5b is formed in the front cover 5 for receiving positioning of the flip-up flash device 12. Also, a rail groove 5c is formed in each of upper and lower edge portions of the front cover 5, and extends horizontally. A ridge 19a protrudes from each of upper and lower edges of the slidable cover 19, and is received in the rail groove 5c.

An inner cover panel 21 is secured to the front of the camera body 4, and retains various elements set on the camera body 4. On the inner cover panel 21 are mounted a power switch 22, a switch lever 23 and a changer mechanism 24 as cover stopper. The power switch 22 turns on and off power for the camera 2. The switch lever 23 transmits motion of the slidable cover 19 to the power switch 22 for switching operation. The changer mechanism 24 regulates a range of sliding of the slidable cover 19.

The power switch 22 is a depressible type, and includes a switch body 22a and a pushbutton element 22b, which is movable into and out of an inside space of the switch body 22a, to turn on and off the power. A support pin 26 is disposed close to the power switch 22, and supports the switch lever 23 in a rotatable manner. The switch lever 23 includes a switching arm 23a and a linking arm 23c. The switching arm 23a is inserted in an opening 21a in the inner cover panel 21, to depress the pushbutton element 22b, or to release the pushbutton element 22b from the depression. The linking arm 23c has a linking pin 23b. A slot 5d is formed in the front portion of the front cover 5. A linking groove 28 is formed in a rear face of the slidable cover 19 to extend horizontally. The linking pin 23b is inserted in the slot 5d and in the linking groove 28. Note that the linking groove 28 has a shape including an end bent portion directed downwards near a lateral edge of the slidable cover 19.

The linking pin 23b of the switch lever 23 is located in a range of the horizontal portion of the linking groove 28 when the slidable cover 19 is in the closed position and between the closed position and a point slightly short of the open position. While the linking pin 23b is in the horizontal range of the linking groove 28, the power for the camera 2 is kept turned off, because the switching arm 23a does not depress the pushbutton element 22b of the power switch 22. When the slidable cover 19 is slid to the open position, the linking pin 23b moves along the end bent portion of the linking groove 28, to cause the switch lever 23 to rotate in the clockwise direction. During this rotation, the switching arm 23a depresses the pushbutton element 22b of the power switch 22, to turn on the power for the camera 2.

Figure 3:
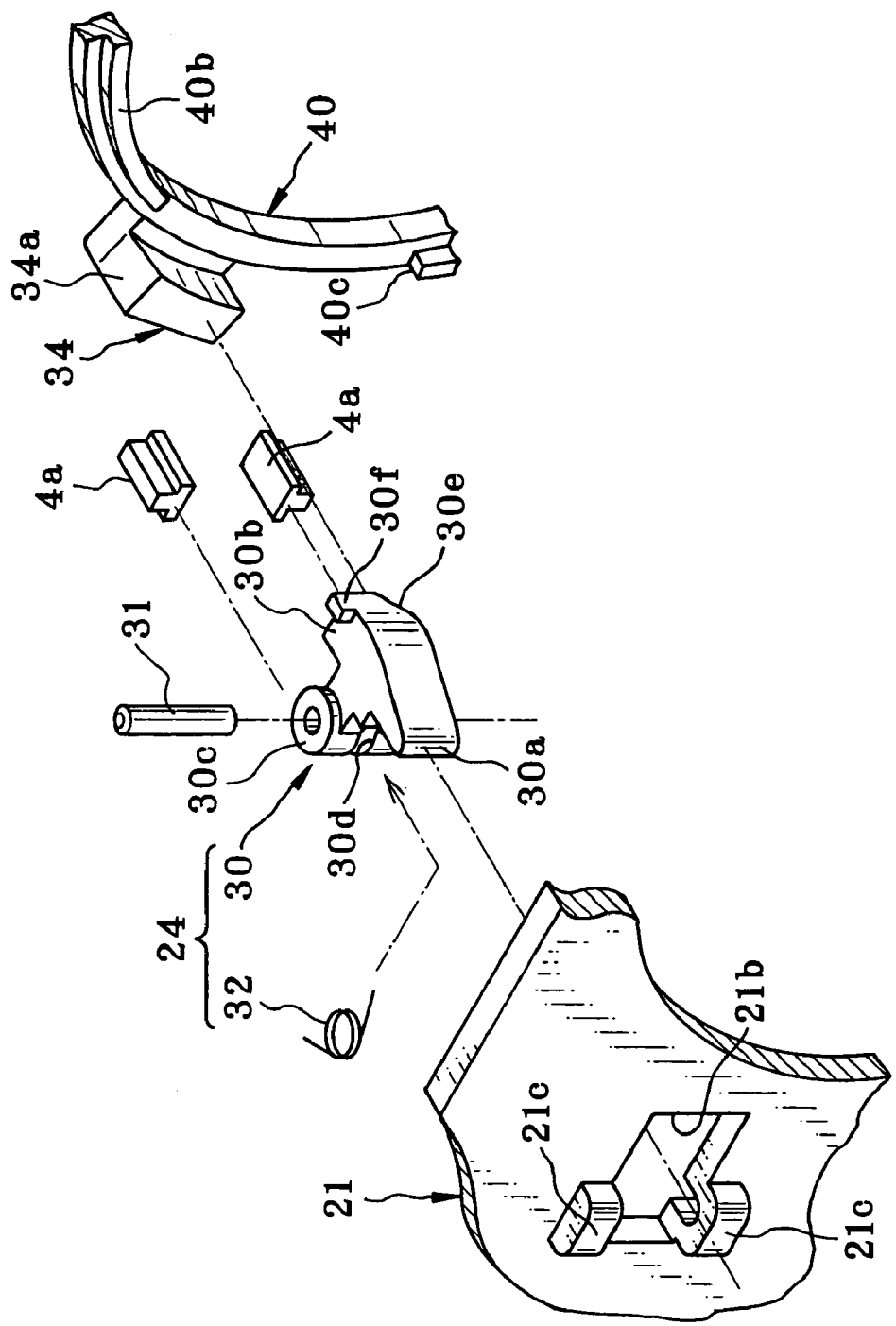
FIG. 3 is an exploded perspective illustrating a cover stopper.
Figure 4A:
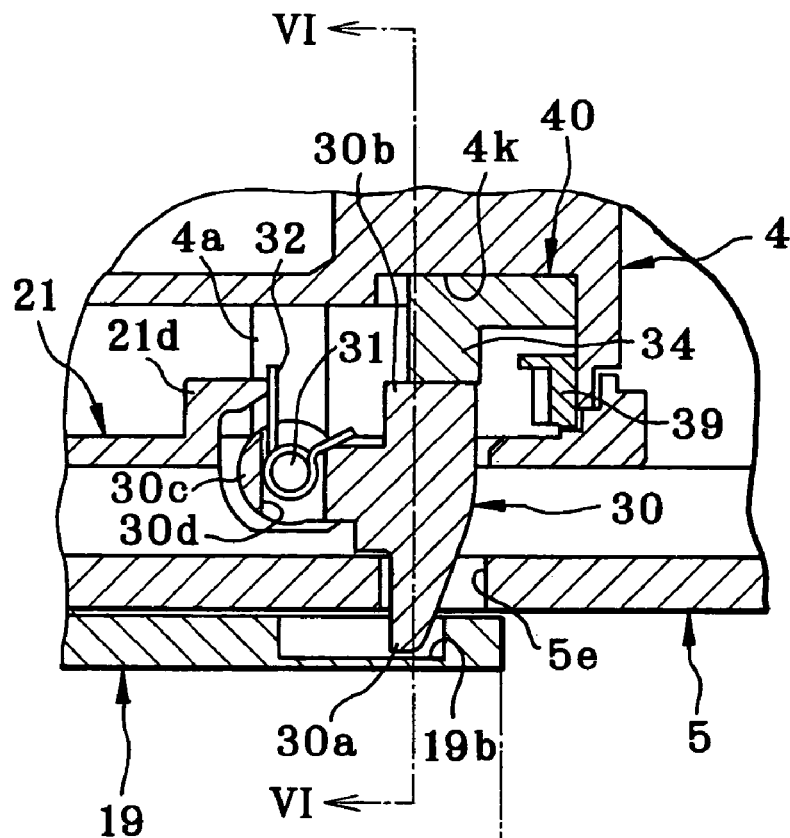
FIG. 4A is a section illustrating elements near to the cover stopper with the slidable cover in the open position.

In FIG. 3, the changer mechanism 24 is illustrated. In FIG. 4A, the state of the same is illustrated in a section in the state of the slidable cover 19 in the open position. The changer mechanism 24 includes a cover stopper 30, a rotational shaft 31 and a torsion coil spring 32. The cover stopper 30 is formed from a plastic material. The shaft 31 is an element of metal. A front end 30a of the cover stopper 30 has a decreasing size in a direction toward the front of the camera. A rear end 30b of the cover stopper 30 has a flat surface that is parallel to a front surface of the camera. Thus, the entirety of the cover stopper 30 is in a wedge shape. One surface of the cover stopper 30 is vertical, where a cylindrical sleeve portion 30c for insertion is formed with the cover stopper 30, and receives insertion of the shaft 31. A cutout 30d is formed in the middle of the sleeve portion 30c, and receives insertion of the torsion coil spring 32. The insertion of the shaft 31 exactly positions the torsion coil spring 32 in the sleeve portion 30c.

The inner cover panel 21 includes an opening 21b, bearing portions 21c and a support portion 21d. The opening 21b receives insertion of the front end 30a of the cover stopper 30. The bearing portions 21c receive both ends of the shaft 31 protruding from end faces of the sleeve portion 30c. The support portion 21d in FIGS. 4A and 5 supports the rear of the sleeve portion 30c for keeping the cover stopper 30 on the inner cover panel 21 without a drop. A pair of support projections 4a are formed with a front of the camera body 4, for supporting both ends of the shaft 31 from behind the same.

Figure 5:
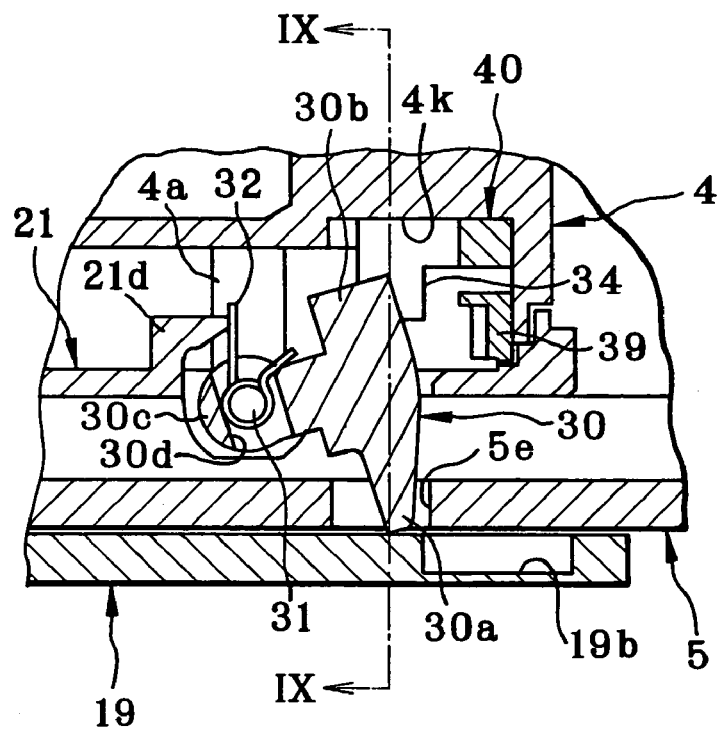
FIG. 5 is a section illustrating elements around the cover stopper in sliding of the slidable cover to the closed position.

An opening 5e is formed in the front cover 5. The front end 30a of the cover stopper 30 is inserted in the opening 5e, and contacts a rear face of the slidable cover 19. A lock hole 19b is formed in the rear of the slidable cover 19, and opposed to the cover stopper 30 when the slidable cover 19 is in the open position, to receive insertion of the front end 30a. In FIG. 5, the cover stopper 30 is rotationally shiftable between a locking position and a releasing position, and when in the locking position, causes the front end 30a to protrude over the front of the front cover 5, and when in the releasing position, keeps the front end 30a inside the front cover 5. The torsion coil spring 32 biases the cover stopper 30 toward the locking position.

Figure 6:
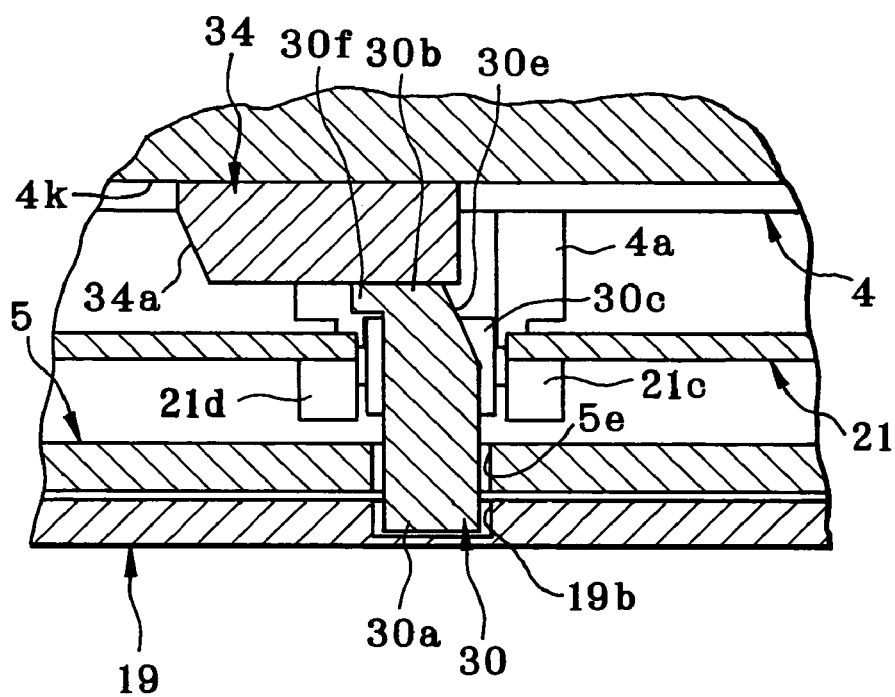
FIG. 6 is a section taken on line VI—VI in FIG. 4A.
Figure 7A:
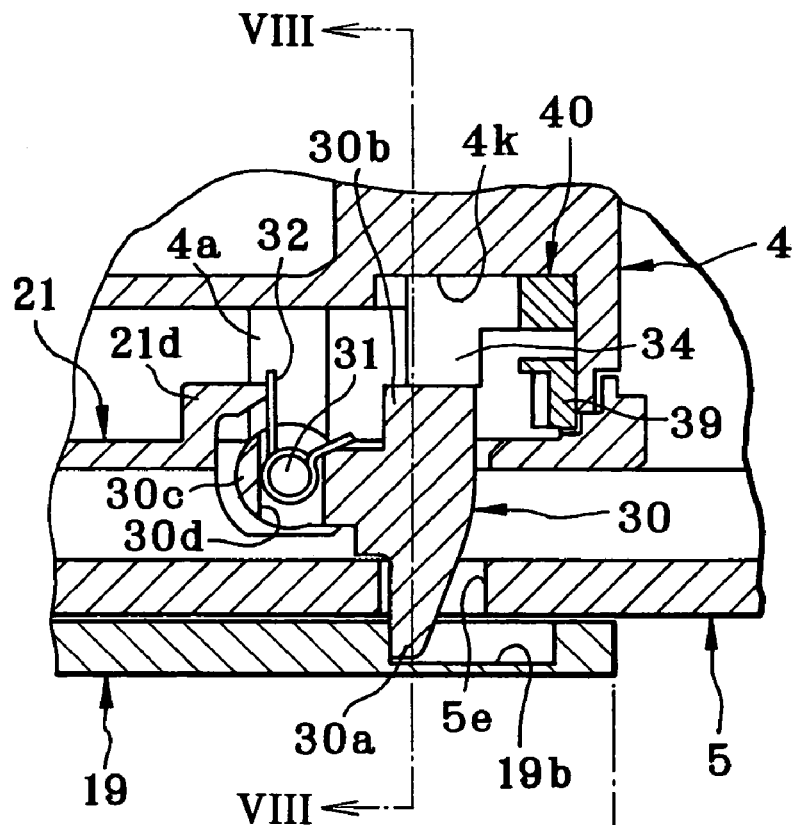
FIG. 7A is a section illustrating the elements around the cover stopper in locking the slidable cover.
Figure 8:
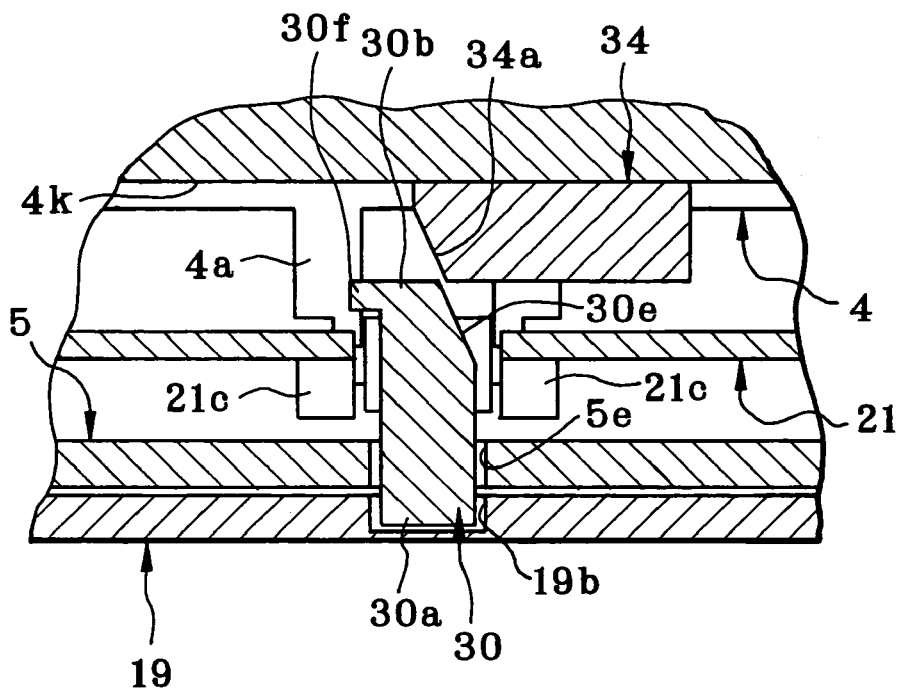
FIG. 8 is a section taken on line VIII—VIII in FIG. 7A.

A lock projection 34 as lock mechanism protrudes from a transmission ring 40, is disposed behind the cover stopper 30, and is movable into and out of a space between the camera body 4 and the rear end 30b of the cover stopper 30. FIG. 6 is a section taken on line VI—VI in FIG. 4A. While the movable lens barrel 9 is set in a certain photographing position between the wide-angle and telephoto end positions, the lock projection 34 contacts the rear end 30b to block rotation of the cover stopper 30 toward the releasing position. In FIG. 7A, if force for sliding is applied to the slidable cover 19 toward the closed position with the movable lens barrel 9 set in one photographing position, the front end 30a of the cover stopper 30 is engaged with the lock hole 19b, and prevents the slidable cover 19 from sliding further than this state. FIG. 8 is a section taken on line VIII—VIII in FIG. 7A. When the movable lens barrel 9 is collapsed entirely, the lock projection 34 moves away from behind the cover stopper 30, and allows the cover stopper 30 to rotate toward the releasing position.

Figure 9:
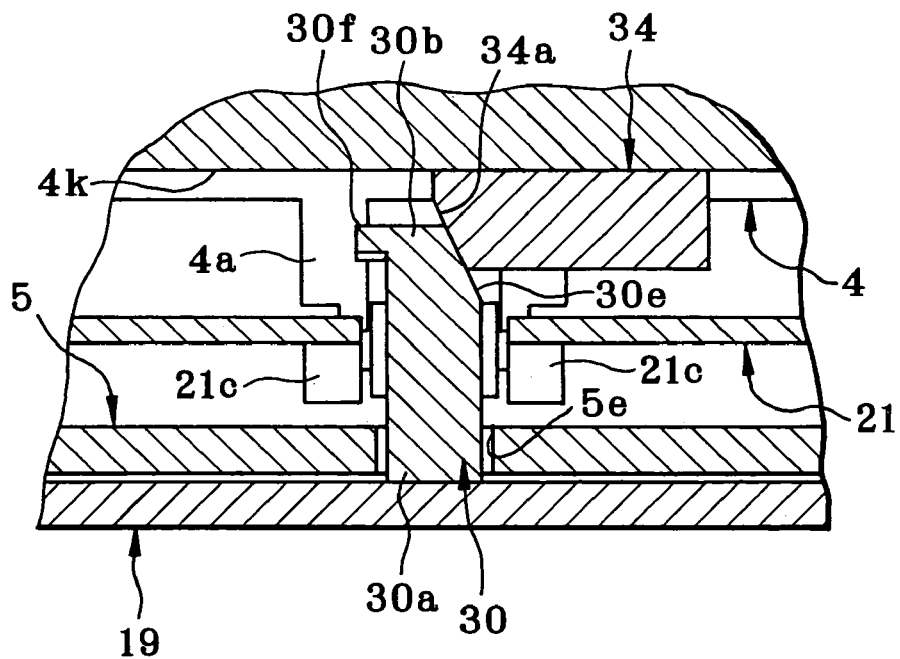
FIG. 9 is a section taken on line IX—IX in FIG. 5.

An inclined face 30e is formed on the cover stopper 30. An inclined face 34a is formed on the lock projection 34. FIG. 9 is a section taken on line IX—IX in FIG. 5. When the cover stopper 30 is rotated to the releasing position, the inclined face 30e pushes the inclined face 34a of the lock projection 34, to move the lock projection 34 in a forward direction as viewed from the cover stopper 30. A projection 30f of the cover stopper 30 is effective in stabilizing the contact between the cover stopper 30 and the lock projection 34 without enlarging the size of the cover stopper 30.

Figure 10:
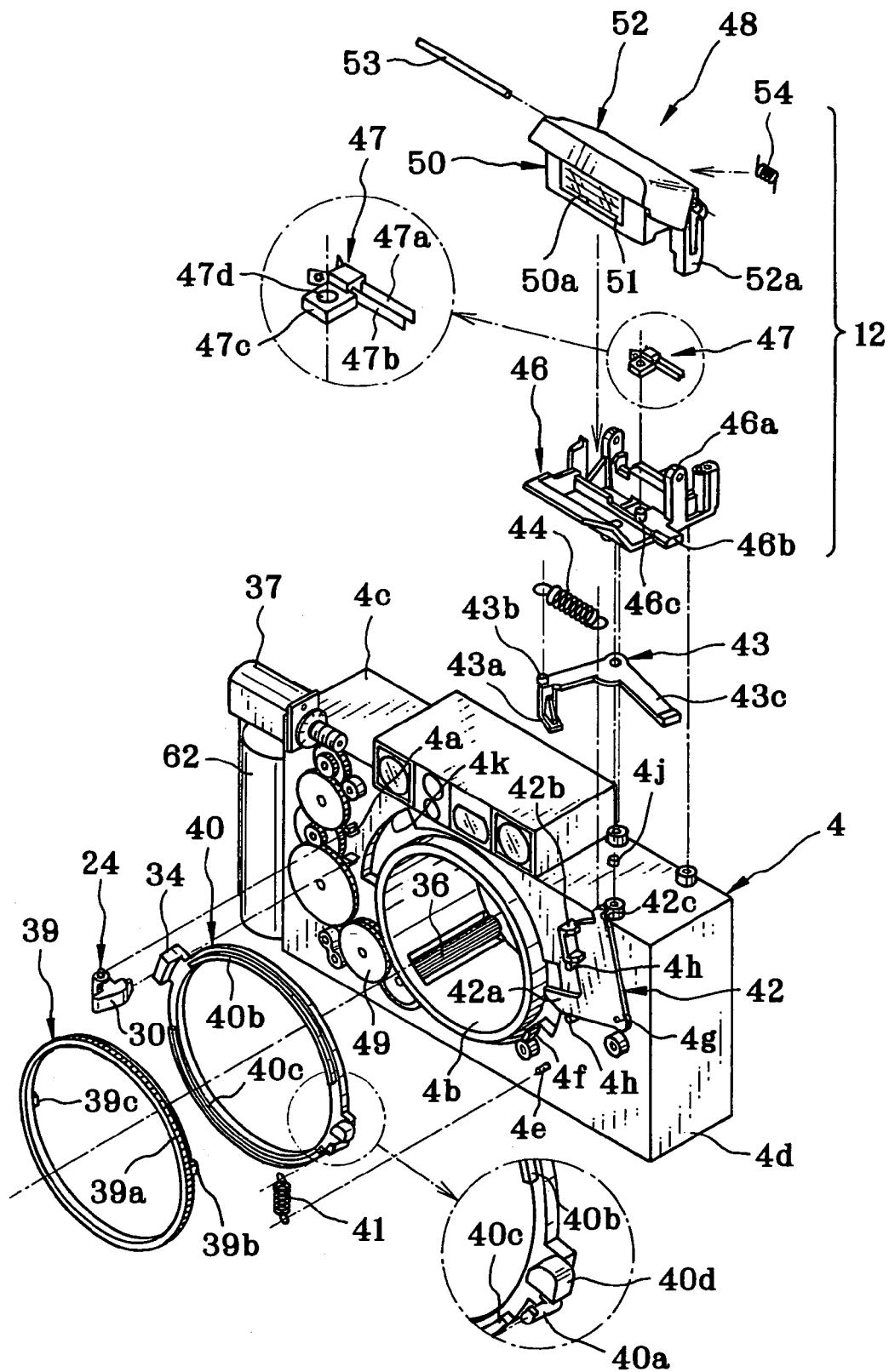
FIG. 10 is an exploded perspective illustrating portions of elements to be secured on the camera body.

In FIG. 10, a state of the camera body 4 from which the inner cover panel 21 is removed is illustrated. The camera body 4 includes a stationary barrel 4b, a cassette loading chamber 4c for a photo film cassette, and a roll chamber 4d for the photo film. The stationary barrel 4b supports the movable lens barrel 9 in a movable manner. The cassette loading chamber 4c and the roll chamber 4d are so disposed that the stationary barrel 4b lies between those. A lens driving gear 36 in a transmission gear mechanism is contained in the stationary barrel 4b, for moving the movable lens barrel 9 between the collapsed position and photographing positions. A motor 37 as driving source is secured to an upper corner of the camera body 4. A set of plural gears are connected with the motor 37, disposed beside the stationary barrel 4b, and transmits rotation of the motor 37 to the lens driving gear 36 for moving the movable lens barrel 9.

To transmit rotation of the motor 37 to the flash emitting unit, elements for transmission include a ring-shaped gear 39, a transmission ring 40, a tension coil spring 41, a first transmission lever 42, a second transmission lever 43 and a lever biasing spring 44 which is a tension coil spring or resilient element. The transmission ring 40 and the ring-shaped gear 39 have such an inner diameter that those are rotatable about the stationary barrel 4b, and are mounted to the periphery of the stationary barrel 4b one after another. A ring-shaped recess 4k is formed in the stationary barrel 4b for receiving the transmission ring 40 in relation to the optical axis direction.

In the ring-shaped gear 39, a tooth train 39a is located thereabout. A gear 49 in the transmission gear mechanism is meshed with the tooth train 39a. When the motor 37 rotates, the ring-shaped gear 39 rotates together for moving the movable lens barrel 9 in the forward or backward direction. A first pressing projection 39b and a second pressing projection 39c projects from a rear face of the ring-shaped gear 39. As viewed in a direction along an arc of the circular shape, the second pressing projection 39c is rotationally symmetrical with the first pressing projection 39b. However, the first and second pressing projections 39b and 39c are differently positioned with respect to radii defined about the rotational center. To be precise, the position of the second pressing projection 39c is determined at a greater radius than that of the position of the first pressing projection 39b.

Figure 11:
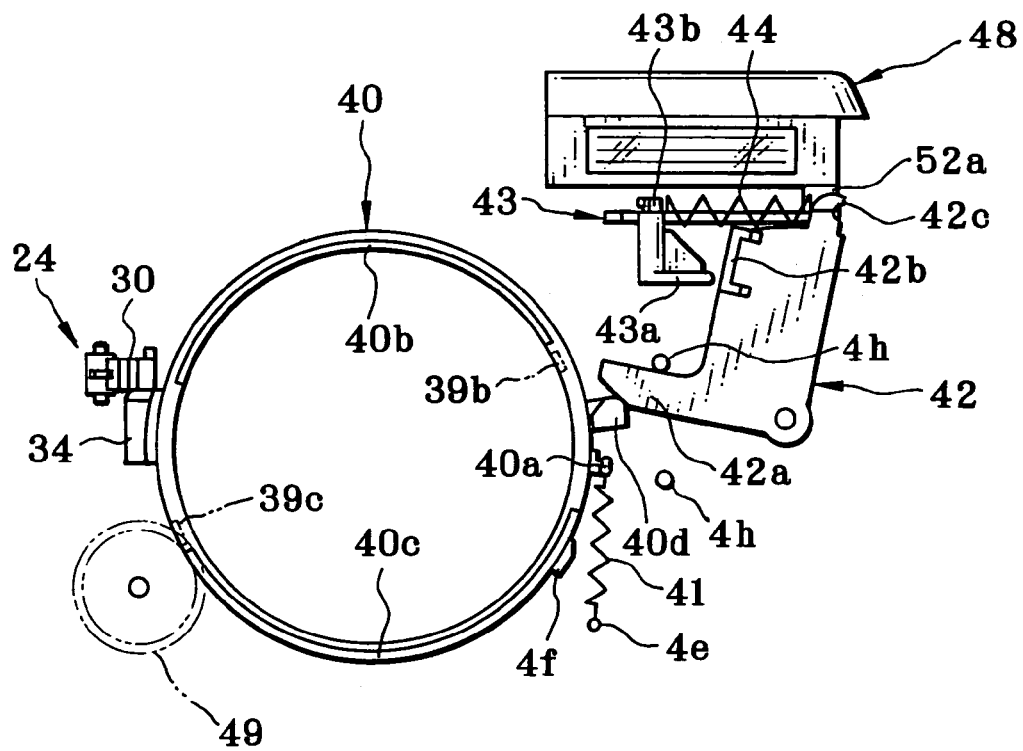
FIG. 11 is a front elevation illustrating elements in a not-photographing state, including a ring-shaped gear and a flip-up flash emitting unit.
Figure 12:
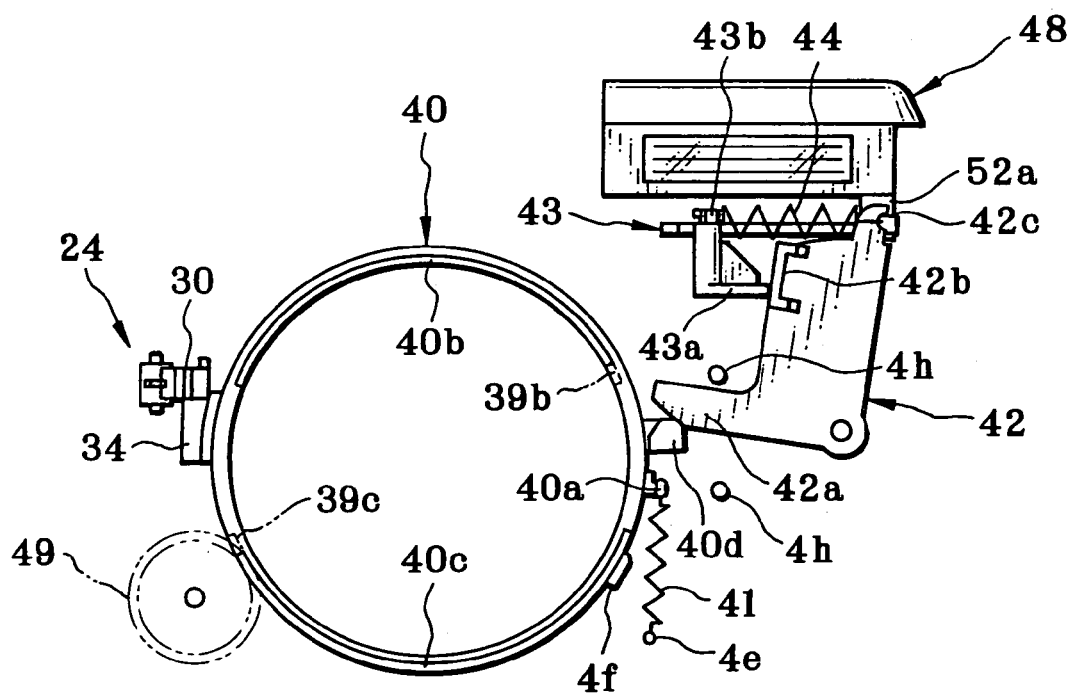
FIG. 12 is a front elevation illustrating the elements in a state immediately after opening the slidable cover.
Figure 13:
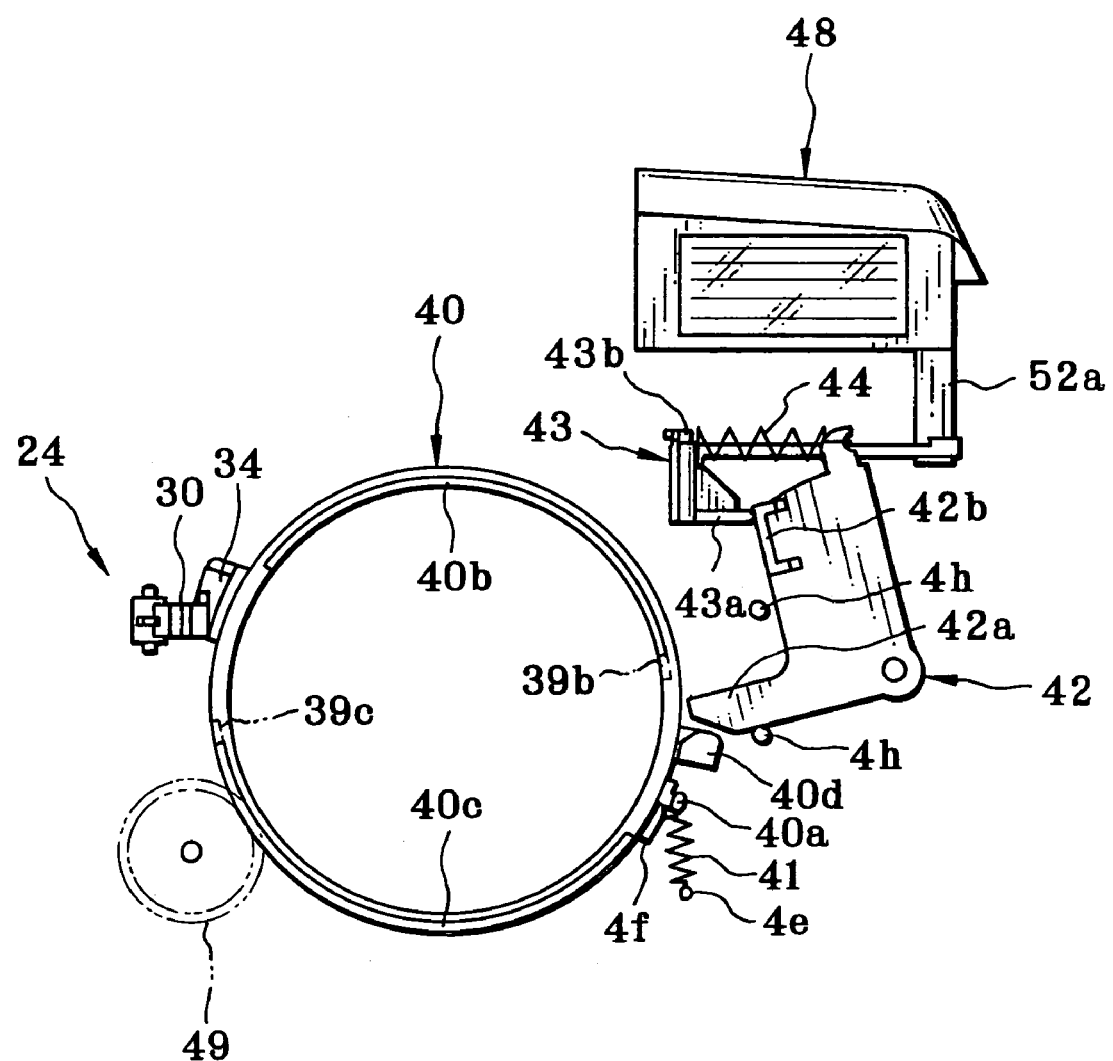
FIG. 13 is a front elevation illustrating the elements in a photographing state.

In FIGS. 11–13, a first engaging ridge 40b as a first engaging portion is formed on a front face of the transmission ring 40 for contact with the first pressing projection 39b of the ring-shaped gear 39. A second engaging ridge 40c as a second engaging portion is formed on the transmission ring 40 for contact with the second pressing projection 39c, and rotationally symmetrical with the first engaging ridge 40b. The first and second engaging ridges 40b and 40c are projections, but are differently positioned with respect to radii defined about their rotational center. To be precise, the position of the second engaging ridge 40c is determined at a greater radius than that of the position of the first engaging ridge 40b, in association with the difference in the radius between the first and second pressing projections 39b and 39c.

The periphery of the transmission ring 40 is provided with a retention pin 40a, a contact projection 40d and the lock projection 34 described heretofore. The retention pin 40a retains a spring end of the tension coil spring 41. The contact projection 40d contacts the first transmission lever 42 in a linking mechanism or flash shifter. A pin 4e protrudes from the front of the camera body 4, and retains a second spring end of the tension coil spring 41, which biases the transmission ring 40 in the clockwise direction. A regulating projection 4f is formed with the front of the camera body 4, contacts the retention pin 40a, and regulates a rotating range of the transmission ring 40 in relation to the clockwise direction.

The first transmission lever 42 has approximately an L-shape. A pin 4g protrudes from the front of the camera body 4, and supports the first transmission lever 42 in a rotatable manner. The first transmission lever 42 includes a linking lever end arm 42a, a contacting lever end portion 42b and a retention pin 42c. The lever end arm 42a contacts the contact projection 40d of the transmission ring 40. The lever end portion 42b contacts the second transmission lever 43. The retention pin 42c retains one spring end of the lever biasing spring 44. A regulating pin 4h protrudes from the front of the camera body 4, contacts the lever end arm 42a, and regulates a rotating amount of the first transmission lever 42.

The second transmission lever 43 in the linking mechanism or flash shifter has an L-shape. A pivotal pin 4j on an upper face of the camera body 4 supports the second transmission lever 43 in a rotatable manner. The second transmission lever 43 includes a contact or engaging end arm 43a, a retention pin 43b and a flash flip-up engaging end arm 43c. The engaging end arm 43a is located in front of the camera body 4, and contacts the lever end portion 42b of the first transmission lever 42. The retention pin 43b retains a second spring end of the lever biasing spring 44. The engaging end arm 43c causes the flash emitting unit to rotate between the contained position and the flashing position.

The lever biasing spring 44 biases the first transmission lever 42 in the counterclockwise direction, and biases the second transmission lever 43 in the clockwise direction. When no load is applied to the first and second transmission levers 42 and 43, then the first transmission lever 42 makes a counterclockwise rotation, the second transmission lever 43 making a clockwise rotation. So the lever end portion 42b contacts the engaging end arm 43a.

The flip-up flash device 12 includes a flash support panel 46, a first switch 47 and a flash emitting unit 48. The flash support panel 46 is firmly secured to the camera body 4 and positioned to keep the second transmission lever 43 rotatable without interference. The first switch 47 is secured to the flash support panel 46. The flash emitting unit 48 is supported on the flash support panel 46 in a rotatable manner. The flash support panel 46 includes a couple of bearing portions 46a as rotational support mechanism, and a stopper pin 46b. The bearing portions 46a keep the flash emitting unit 48 rotatable. The stopper pin 46b prevents the flash emitting unit 48 from moving beyond the flashing position.

The first switch 47 is constituted by elements including contact segments 47a and 47b of metal, and a contact segment holder 47c of a plastic material. A flash circuit 62 of FIG. 2 which includes a main capacitor, is connected with the contact segments 47a and 47b. The contact segment holder 47c holds the contact segments 47a and 47b in a state kept from contacting each other. A hole 47d is formed in the contact segment holder 47c. A pin 46c protrudes over an upper face of the flash support panel 46, is inserted in the hole 47d to keep the first switch 47 fastened. When the contact segments 47a and 47b in the first switch 47 are contacted by one another, the first switch 47 is closed to enable the flash circuit 62 to emit flash light from the flash emitting unit 48.

The flash emitting unit 48 includes a light source holder 50, a cover panel 52, a rotational shaft 53 of metal as rotational support mechanism, and a flash flip-up biasing spring 54 as torsion coil spring of metal. The light source holder 50 has a front opening 50a and a diffusing lens 51 or Fresnel lens. The front opening 50a is in a front portion of the light source holder 50. A flash tube and a reflector are contained in the light source holder 50 behind the front opening 50a. The diffusing lens 51 is fitted in the front opening 50a of the light source holder 50 to constitute the flashing surface 13. The cover panel 52 is secured to an upper side of the light source holder 50, and comes to constitute an extension of the front cover 5 when the flash emitting unit 48 is set in the contained position rotationally. The shaft 53 is inserted in the bearing portions 46a of the flash support panel 46 and in a through hole of the cover panel 52, and sets the flash emitting unit 48 on the flash support panel 46 in a rotatable manner. The flash flip-up biasing spring 54 is contained between the cover panel 52 and the light source holder 50, and biases the flash emitting unit 48 toward the flashing position.

Figure 14:
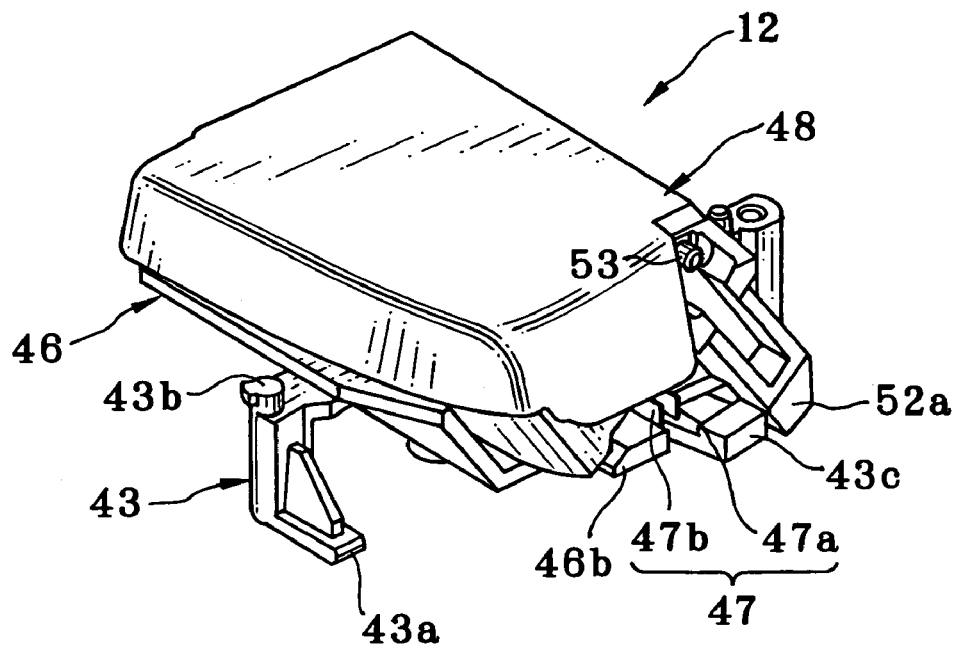
FIG. 14 is a perspective illustrating the flash emitting unit set in a contained position.
Figure 15:
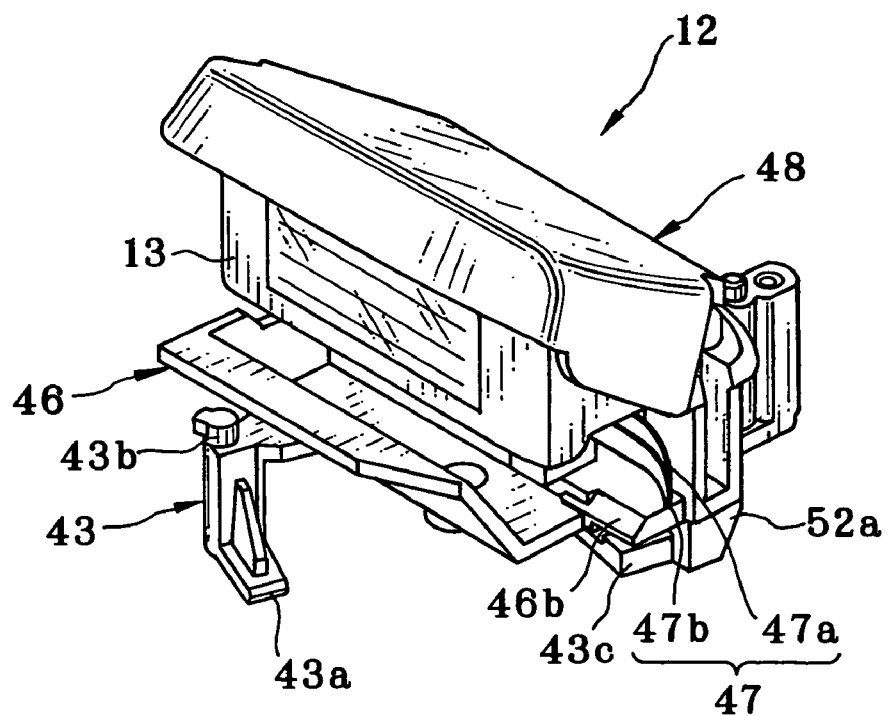
FIG. 15 is a perspective illustrating the flash emitting unit set in a flashing position.

In FIGS. 14 and 15, a first arm 52a or lever projection protrudes from the cover panel 52, to contact the engaging end arm 43c of the second transmission lever 43. When the flash emitting unit 48 is rotationally shifted to the flashing position, the first arm 52a contacts the stopper pin 46b of the flash support panel 46, to keep the flash emitting unit 48 in the flashing position. Also, when the flash emitting unit 48 is rotationally shifted to the flashing position, the first arm 52a presses the contact segment 47a of the first switch 47, and causes the same to contact the contact segment 47b.

Figure 7B:
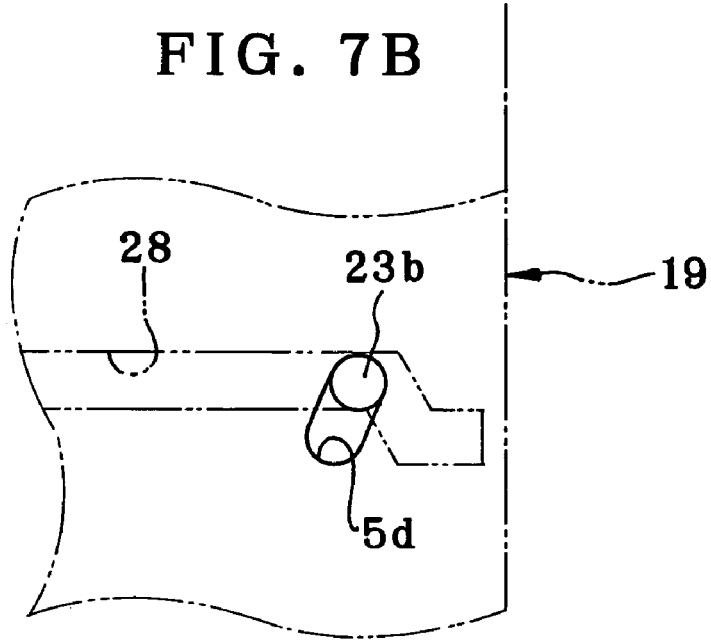
FIG. 7B is an explanatory view in plan, illustrating another state of the linking pin positioned at a point in the linking groove.

The operation of the above embodiment is described now. In FIG. 1A, the slidable cover 19 is set in the closed position when the camera 2 is not used. The slidable cover 19 is covering the movable lens barrel 9. In FIGS. 2 and 7B, the linking pin 23b of the switch lever 23 is positioned in the horizontal portion of the linking groove 28 of the slidable cover 19. The power switch 22 is kept turned off by the linking pin 23b.

In FIGS. 5 and 9, the cover stopper 30 is rotationally set in the releasing position because depressed by the slidable cover 19 while the power is turned off. The inclined face 30e presses the inclined face 34a of the lock projection 34, to set the transmission ring 40 rotationally in the counterclockwise direction in FIG. 11. In FIG. 11, the contact projection 40d of the transmission ring 40 pushes the lever end arm 42a, and rotationally sets the first transmission lever 42 in the clockwise direction.

The first transmission lever 42 causes the lever biasing spring 44 to pull the second transmission lever 43. In FIG. 10, the second transmission lever 43 is rotated in the counterclockwise direction. In FIG. 14, the engaging end arm 43c of the second transmission lever 43 presses the first arm 52a in the counterclockwise direction, to set the flash emitting unit 48 rotationally in the contained position.

While the power is turned off, the first transmission lever 42 is positioned farther from the second transmission lever 43 to overcharge the lever biasing spring 44. Thus, the flash emitting unit 48 can be kept in the contained position reliably. As the cover stopper 30 rotates the transmission ring 40, the first and second pressing projections 39b and 39c come away from respectively the first and second engaging ridges 40b and 40c. The ring-shaped gear 39 is unlinked from the transmission ring 40. Thus, the gears can be free from application of load with time even in connection with the tension coil spring 41 or the lever biasing spring 44, or the flash flip-up biasing spring 54. The teeth of the gear can be protected from unwanted deformation with creep.

Figure 4B:
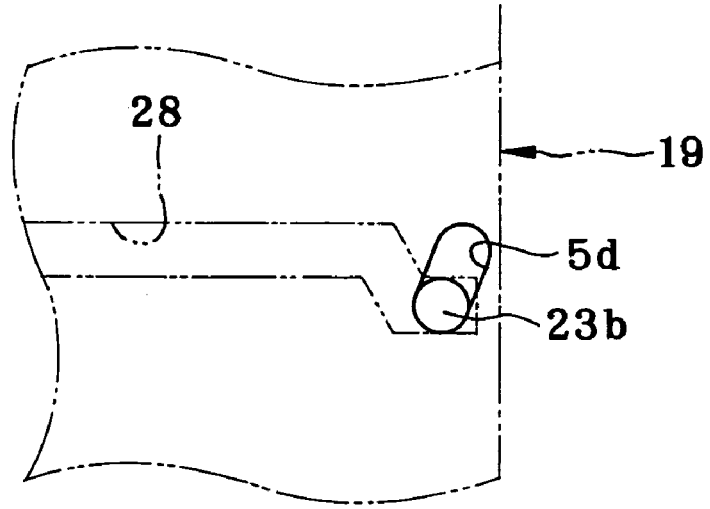
FIG. 4B is an explanatory view in plan, illustrating a state of a linking pin positioned at a point in a linking groove.

In FIG. 1B, the slidable cover 19 is slid to the open position. In FIG. 4B, the linking pin 23b is shifted to the end bent portion of the linking groove 28. The switch lever 23 makes a clockwise rotation in FIG. 2. It follows that the switching arm 23a depresses the pushbutton element 22b of the power switch 22, to turn on the power of the camera. In FIG. 4A, the cover stopper 30 rotates to the locked position, to insert the front end 30a into the lock hole 19b of the slidable cover 19.

When the cover stopper 30 rotationally moves to the locking position, the transmission ring 40 is caused by the tension coil spring 41 to rotate in the clockwise direction in FIG. 12. The first and second engaging ridges 40b and 40c are caused to contact the first and second pressing projections 39b and 39c of the ring-shaped gear 39.

When the -power for the camera 2 is turned on, the motor 37 rotates in the direction to move the movable lens barrel 9 forwards. Rotations of the motor 37 are transmitted to the lens driving gear 36 by the transmission gear mechanism having plural gears, to move the movable lens barrel 9 forwards with respect to the camera 2. Also, the rotations of the motor 37 are transmitted by the gear 49 to the ring-shaped gear 39, to cause the ring-shaped gear 39 to rotate in the clockwise direction. In response to the clockwise rotation of the ring-shaped gear 39, the first and second engaging ridges 40b and 40c are released from depression with the first and second pressing projections 39b and 39c. The transmission ring 40, biased by the tension coil spring 41, rotates further in the clockwise direction.

In FIG. 13, the retention pin 40a rotates to a position for contacting the regulating projection 4f. In FIGS. 4A and 6, the lock projection 34 moves to the position between the camera body 4 and the cover stopper 30, to block rotation of the cover stopper 30 directed toward the releasing position. Thus, the slidable cover 19 is locked in the open position.

The first transmission lever 42 is released from the depression with the contact projection 40d of the transmission ring 40. Thus, the first transmission lever 42 is caused to make a counterclockwise rotation by the lever biasing spring 44, which causes the second transmission lever 43 to make a clockwise rotation. The first arm 52a is released from the depression with the engaging end arm 43c. In FIG. 15, the flash flip-up biasing spring 54 causes the flash emitting unit 48 to rotate toward the flashing position. The first arm 52a comes in contact with the stopper pin 46b of the flash support panel 46, firmly to set the flash emitting unit 48 in the flashing position.

The first arm 52a of the flash emitting unit 48 rotationally set in the flashing position depresses the contact segment 47a of the first switch 47, and causes the same to contact the contact segment 47b. Thus, a signal to enable the flash circuit 62 is output by the contact segment 47b. The setting of the flash emitting unit 48 in the flashing position is detected.

As described heretofore, the first arm 52a in a single form is multi-functional, because of linking the flash emitting unit 48 with the second transmission lever 43, setting the flash emitting unit 48 in the flashing position, and turning on and off of the first switch 47. It is possible to prevent the unwanted enlargement of the flash emitting unit, and to determine points of the operation of the first arm 52a with a sufficient distance from the rotational center of the flash emitting unit 48. Also in view of this, it is possible with the first arm 52a to keep the precision high in the operation.

The first arm 52a is kept unlinked from the second transmission lever 43. If external force is applied to the flash emitting unit 48 incidentally toward the contained position, or if the switch for turning on the power is operated with force to the flash emitting unit 48 toward the contained position, there will occur no damages in the camera 2. If the flash emitting unit 48 is forcibly rotated to the flashing position in the turned-off state of the power, the camera 2 can be still protected from being damaged, because rotation of the second transmission lever 43 is absorbed by the lever biasing spring 44, and prevented from transmission to the first transmission lever 42.

The ring-shaped gear 39 rotates also when the movable lens barrel 9 moves from the wide-angle end position to the telephoto end position. A ratio of the speed reduction of the gears is considerably great because of the great diameter of the ring-shaped gear 39. This is effective in keeping small a rotating amount of the ring-shaped gear 39. There is no incidental abutment of the first and second pressing projections 39b and 39c on faces opposite to the first and second engaging ridges 40b and 40c. The radius of the position of the first pressing projection 39b and the first engaging ridge 40b is different from the radius of the second pressing projection 39c and the second engaging ridge 40c. The transmission of force between the ring-shaped gear 39 and the transmission ring 40 according to couple of the force can be safe without abutment between the first pressing projection 39b and the second engaging ridge 40c.

After exposures are taken, the slidable cover 19 is slid to the home position, the front end 30a of the cover stopper 30 becomes engaged with the lock hole 19b. See FIG. 7A. The slidable cover 19 is kept from sliding. In FIG. 7B, the slidable cover 19 is being locked by the cover stopper 30. The linking pin 23b of the switch lever 23 is set in the horizontal portion of the linking groove 28. The power of the camera 2 is turned off while the slidable cover 19 is locked in the position without interference with the movable lens barrel 9. The movable lens barrel 9 is moved backwards for the collapse.

Most of the force applied in a direction to slide the slidable cover 19 toward the closed position is applied to the front end 30a of the cover stopper 30. The cover stopper 30 can be free from breakage, because the front end 30a has a sufficient thickness, and has a wedge shape with a substantially small length. The force to the cover stopper 30 is also transmitted to the lock projection 34 of the transmission ring 40. However, the transmission ring 40 does not break, because the force to the lock projection 34 is received by the ring-shaped recess 4k of the camera body 4 disposed behind. Furthermore, upper surfaces of the rear end 30b of the cover stopper 30 and the lock projection 34 are flat or very smooth. Rotation of the transmission ring 40 is prevented from being blocked even when the cover stopper 30 is pressed against the lock projection 34.

Rotation of the motor 37 is transmitted to the lens driving gear 36 by plural gears in the transmission gear mechanism, to collapse the movable lens barrel 9. The ring-shaped gear 39 is rotated by the gear 49 in the counterclockwise direction. The transmission ring 40 rotates in the same direction as the first and second pressing projections 39b and 39c push the first and second engaging ridges 40b and 40c. The contact projection 40d pushes the lever end arm 42a of the first transmission lever 42, which is rotated in the clockwise direction. The first transmission lever 42 causes the lever biasing spring 44 to rotate the second transmission lever 43 in the counterclockwise direction. The engaging end arm 43c pushes the first arm 52a of the flash emitting unit 48. In FIG. 14, the flash emitting unit 48 rotationally shifts to the contained position.

To contain the flash emitting unit 48, high force is required because of a direction of the force against the bias of the tension coil spring 41, the lever biasing spring 44 and the flash flip-up biasing spring 54. However, the ratio of the speed reduction can be very great owing to the ring-shaped gear 39. It is possible to rotate the flash emitting unit 48 smoothly and lightly. The ring-shaped gear 39 and the transmission ring 40 rotate only at a small amount in the course of moving of the movable lens barrel 9 between the collapsed position and the wide-angle end position. However, a great stroke on the outer periphery can be obtained by means of the considerably great diameter of the ring-shaped gear 39 and the transmission ring 40. The flash emitting unit 48 can be linked with high reliability.

For transmission between the transmission ring 40 and the flip-up flash device 12, the first and second transmission levers 42 and 43 are used and disposed on the upper and front panels of the camera 2. This is effective in economizing the space for containing, and reducing the size of the entirety of the camera 2. Furthermore, the lever biasing spring 44 with a low cost is used for connection between the first and second transmission levers 42 and 43. It is possible to contain the lever biasing spring 44 in a considerably small space in comparison with a space which would contain a toggle spring or the like. A manufacturing cost can be reduced remarkably.

The motor 37 stops rotating upon the completion of collapsing of the movable lens barrel 9 and the containing of the flash emitting unit 48. In FIG. 8, the lock projection 34 moves away from the rear of the cover stopper 30. The slidable cover 19 is released from blocking of the cover stopper 30. When the slidable cover 19 is slid to the closed position, the cover stopper 30 is pushed by the rear of the slidable cover 19, and rotates to the releasing position. In FIG. 9, the inclined face 30e pushes the inclined face 34a of the lock projection 34. In FIG. 11, the transmission ring 40 is caused to make a counterclockwise rotation. Therefore, the load of the tension coil spring 41, the lever biasing spring 44 and the flash flip-up biasing spring 54 becomes applied to the cover stopper 30 in place of the ring-shaped gear 39.

In the above embodiment, the ring-shaped gear 39 is disposed in front of the transmission ring 40. However, the ring-shaped gear 39 may be disposed behind the transmission ring 40.

In the above embodiment, the flash built-in camera of the invention is a photographic camera for use with silver halide photographic film. Furthermore, a camera of the invention can be a digital still camera, a digital video camera, or other optical instrument provided with a flip-up flash device.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera comprising:
   a movable lens barrel movable between a collapsed position, a wide-angle position and a telephoto position, contained in a camera body when in said collapsed position, set more forward when in said wide-angle position than when in said collapsed position, and set more forward when in said telephoto position than when in said wide-angle position, for holding a taking lens;
   a flash emitting unit movable between a contained position and a flashing position, contained in said camera body when in said contained position, and set out of said camera body when in said flashing position, and adapted to emit flash light to a photographic field;
   a motor disposed in said camera body, for rotating forwards to move said movable lens barrel toward said telephoto position, and for rotating backwards to move said movable lens barrel toward said collapsed position;
   a transmission gear mechanism for transmitting rotation of said motor to move said movable lens barrel;
   a ring-shaped gear, disposed about said movable lens barrel in a rotatable manner, for rotating in a first direction when said motor rotates forwards, and for rotating in a second direction when said motor rotates backwards;
   a transmission ring disposed about said movable lens barrel in a rotatable manner in said first and second directions;
   a transmission mechanism, responsive to rotation of said ring-shaped gear, for rotating said transmission ring while said movable lens barrel moves between said collapsed position and said wide-angle position; and a linking mechanism, responsive to rotation of said transmission ring, for moving said flash emitting unit between said contained position and said flashing position.

2. A camera as defined in claim 1, further comprising a stationary barrel, formed to project forwards from said camera body, for supporting said movable lens barrel movably in forward and backward directions;

wherein said ring-shaped gear and said transmission ring are secured to an outer surface of said stationary barrel in a rotatable manner.

3. A camera as defined in claim 2, wherein said ring-shaped gear and said transmission ring are adjacent with one another in an optical axis direction of said movable lens barrel.

4. A camera as defined in claim 2, wherein said transmission mechanism includes:

first and second pressing projections for projecting from said ring-shaped gear;

a first biasing element for biasing said transmission ring, to rotate said transmission ring in said first direction;

a first stopper for blocking rotation of said transmission ring rotating in said first direction, said first stopper operating for blocking rotationally when said movable lens barrel is moved from said collapsed position to said wide-angle position;

first and second engaging projections for projecting from said transmission ring in an engageable manner with respectively said first and second pressing projections, wherein when said ring-shaped gear rotates in said first direction, said transmission ring is caused by said first biasing element to rotate in said first direction, said first and second engaging projections rotating simultaneously with said first and second pressing projections, and when said ring-shaped gear rotates in said second direction, said transmission ring is caused to rotate in said second direction by pressing of said first and second pressing projection to said first and second engaging projections.

5. A camera as defined in claim 4, wherein said first and second pressing projections are disposed away from one another substantially by one flat angle, said first and second engaging projections are disposed away from one another substantially by one flat angle, and rotation of said ring gear is transmitted by couple of force to said transmission ring.

6. A camera as defined in claim 5, wherein said first and second pressing projections are positioned at radii different from one another with respect to a rotational center thereof, and also said first and second engaging projections are positioned at radii different from one another with respect to said rotational center.

7. A camera as defined in claim 6, wherein said first and second engaging portions are disposed to extend in an arc shape.

8. A camera as defined in claim 4, wherein said linking mechanism further includes:

a shaft for rotationally supporting said flash emitting unit movably between said contained position and said flashing position;

a first transmission lever rotatable in response to rotation of said transmission ring; and a second transmission lever for being rotated in a third or fourth direction in response to rotation of said first transmission lever, for moving said flash emitting unit from said contained position to said flashing position when rotated in said third direction, and for moving said flash emitting unit from said flashing position to said contained position when rotated in said fourth direction.

9. A camera as defined in claim 8, wherein said linking mechanism further includes a second biasing element for connecting said first and second transmission levers with one another for rotation thereof together, and for allowing said second transmission lever to rotate in said third direction when said flash emitting unit moves from said contained position forcibly to said flashing position during a stop of said first transmission lever.

10. A camera as defined in claim 9, wherein said linking mechanism further includes:

a third biasing element for biasing said flash emitting unit toward said flashing position; and an arm, formed on said flash emitting unit, for contacting said second transmission lever, wherein when said second transmission lever rotates in said third direction, said arm is caused by said third biasing element to move said flash emitting unit toward said flashing position simultaneously with said second transmission lever, and when said second transmission lever rotates in said fourth direction, said arm is pressed by said second transmission lever to move said flash emitting unit toward said contained position.

11. A camera as defined in claim 10, further comprising:

a flash circuit for driving said flash emitting unit to emit said flash light;

a switch, connected with said flash circuit, for being changed over by shifting of said flash emitting unit, and for inhibiting driving of said flash emitting unit when said flash emitting unit is in said contained position.

12. A camera as defined in claim 11, further comprising a second stopper for preventing said flash emitting unit from moving beyond said flashing position.

13. A camera as defined in claim 11, wherein said switch is disposed at a moving path of said arm, and is changed over by said arm.

14. A camera as defined in claim 12, wherein said second stopper becomes engaged with said arm for preventing said flash emitting unit from moving.

* * * * *